United States Patent Office  
3,218,505  
Patented Nov. 16, 1965

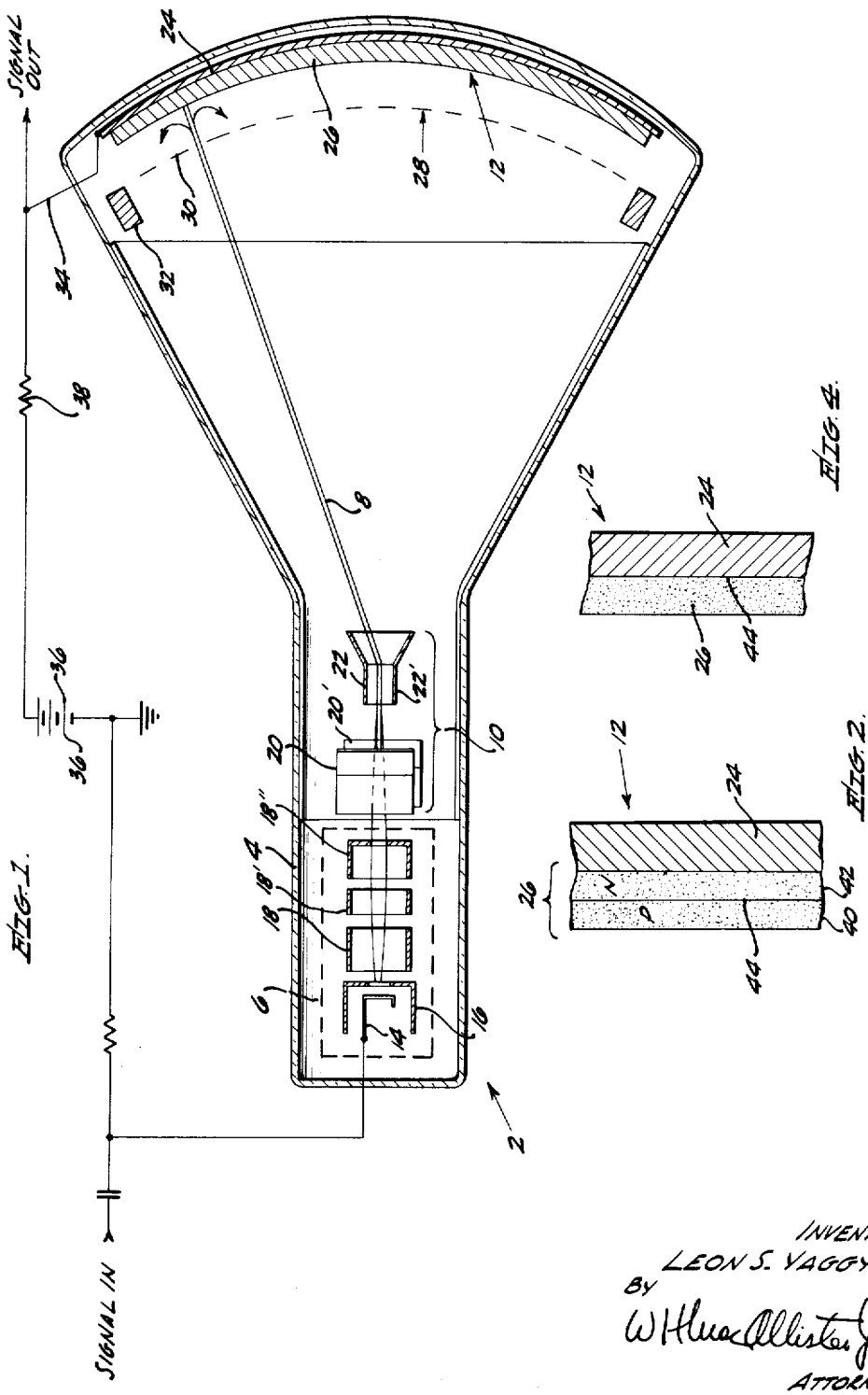

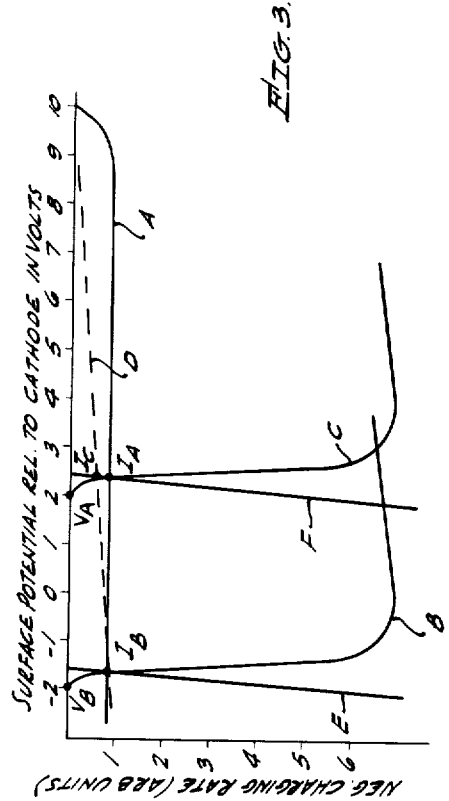
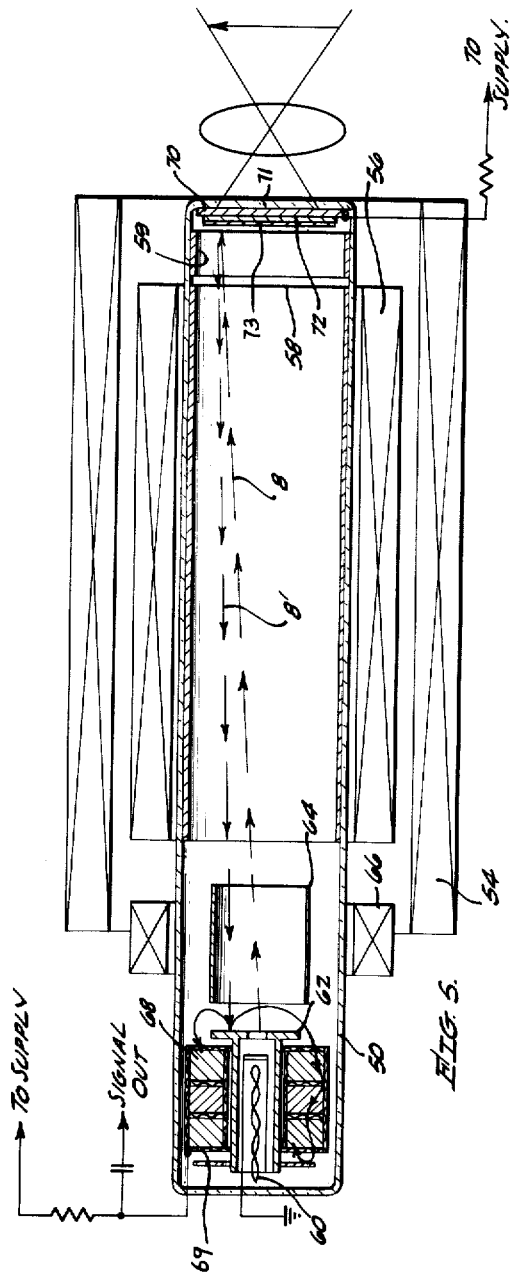

3,218,505
MOVING TARGET INDICATOR TUBE HAVING RECTIFYING BARRIER TARGET ELECTRODE
Leon S. Yaggy, North Carlsbad, Calif., assignor to Hughes Aircraft Company, Culver City, Calif., a corporation of Delaware
Filed July 23, 1962, Ser. No. 211,536
3 Claims. (Cl. 315—12)

This invention relates to cathode ray tubes of the type providing an electrical output or "readout." More particularly the invention relates to cathode ray tubes of the type wherein information, either in the form of an optical image or an electrical signal, is analyzed and an electrical output signal thereof is provided for only changing information.

This function of providing an output signal representative of only changing input information is of considerable utility in systems for detecting moving targets such as radar and other radio detection or navigation systems. This function is commonly referred to as "fixed target cancellation"; devices, such as the present invention, for achieving such cancellation are known as "moving target indicators." While this function is of obvious significance in military operations, it is not restricted thereto and is also useful in such applications as air traffic control systems.

Heretofore it has been proposed to achieve "fixed target cancellation" by means of devices capable of storing information and comparing newly obtained information with the stored information. A typical device for this purpose is the barrier grid storage tube such as described by Knoll and Kazan in their book "Storage Tubes and Their Basic Principles" (John Wiley & Sons, Inc., New York, 1952). In addition to being limited in resolution because a cellular or mesh storage structure is employed at a plane of focus in such prior art tubes, the comparison process often involves complicated circuitry such as described in U.S. Patent 2,853,702 to M. C. Johnson, et al. In many instances, an alternation of input processes is required at the storage device thus preventing a smooth, continuous flow of information.

It is therefore an object of the present invention to provide an improved moving target indicator tube.

Another object of the invention is to provide an improved moving target indicator tube of high resolution and providing a continuous output signal without the necessity of alternating input and output functions.

Yet another object of the invention is to provide an improved moving target indicator tube having an optical signal input and an electrical signal output.

These and other objects and advantages of the invention are realized by providing a meshless storage electrode having a "leaky" dielectric layer and adapted to be scanned by an electron beam in a cathode ray tube. A potential difference across the dielectric layer is established by the beam current such that elemental surface areas of the storage electrode are maintained at or near the instantaneous cathode potential. Thus at points of scan by the beam corresponding to fixed or unchanged bits of information, it is only necessary to restore or replace the charge lost due to leakage current through the dielectric. The replacement by the beam of the charge lost due to the leakage current, which in the case of fixed target information would be small and fixed, results in a small and fixed current at the output because of the capacitive or displacement current which flows through the dielectric layer when the beam strikes the elemental surface areas. Where target information changes, a larger or smaller capacitive current will flow through the dielectric layer to a backing electrode in contact therewith as required to charge the capacitance of the layer to the new cathode voltage corresponding to the new information. Thus, if the potential at a particular point of scan is to be lower (that is, be more negative) than the potential thereat during the previous scan, a much larger current will flow for this and several succeeding scans until an equilibrium is reached corresponding to the new and lower cathode potential. If the charging potential at a particular point of scan is to be higher (that is, be less negative) than the potential thereat during the previous scan, no current will flow for this and several succeeding scans until leakage current has brought the surface potential up to the new equilibrium. In either instance, the current flow thereafter becomes the small and fixed current necessary to replace or restore the charge lost due to leakage through the dielectric layer. Thus, a small steady output signal current from the backing electrode represents, for a given point of scan, no change thereat; a large current output signal represents a change in information such as from previous "black" information to "white" information; and a zero current output signal represents a change in information as from previous "white" information to "black" information. In practice, the output from the tube of the present invention is adjusted so that the small, steady output current does not appear or, in other words, is made equal to "zero" and only changes in this current appear as the output.

The invention will be described in greater detail by reference to the drawings in which:

FIGURE 1 is a cross-sectional elevational view of a cathode ray tube utilizing an electrical input according to the invention;

FIGURE 2 is a cross-sectional elevational view of an alternative embodiment of a leaky storage electrode according to the invention for use with a tube such as shown in FIGURE 1;

FIGURE 3 is a diagram illustrating the cancellation principle of the present invention;

FIGURE 4 is a cross-sectional elevational view of another embodiment of a leaky dielectric storage electrode according to the invention for use with a tube such as shown in FIGURE 1; and FIGURE 5 is a cross-sectional elevational view of a cathode ray tube utilizing an optical input according to another embodiment of the invention.

Referring now to FIGURE 1, a fixed target cancellation tube 2 according to the invention is shown comprising an evacuated envelope 4 containing an electron gun assembly 6 for forming an electron beam 8 of elemental cross-sectional area, a deflection system 10 for deflecting the beam 8 horizontally and vertically, and a target assembly 12. The electron gun assembly 6 comprises a cathode 14, a control or intensity grid 16, and beam focusing and accelerating electrodes 18, 18', and 18". The gun assembly 6 may be of conventional and well-known design and further detail description of the structure and operation thereof is not deemed necessary herein. While an electrostatic deflection system 10 is shown, this is merely for convenience and an electromagnetic deflection system may be employed to equal advantage as is well-understood in the art. The deflection system 10 shown comprises a pair 20, 20' of horizontal deflecting plates and a pair 22, 22' of vertical deflecting plates.

The target assembly 12 comprises a backing electrode 24 which may be a plate of electrically conductive material such as nickel or electrically conductive glass. The surface of the backing electrode 24 facing the electron gun end of the envelope 4 is provided with a layer 26 of leaky dielectric material according to the invention. The dielectric material should have a secondary electron emission ratio of less than unity for low energy primary electrons (i.e., up to 10 volts); in addition the capacitance of the layer 26 should be as high as possible and the resistance should be of such a value as to provide a capacitive time-constant with the capacitance that is considerably longer than the time between scans of the electron beam. For example, a capacitance of 5000 micromicrofarads per square centimeter or more and a resistance of between $10^8$ and $10^{10}$ ohms per square centimeter would satisfy this requirement for standard television scanning rates.

Adjacent to the target assembly 12 is an electrode 28 for collecting secondary electrons emitted by the dielectric layer 26. The collector electrode 28 may comprise an electron-transparent mesh 30 of metal, for example, mounted on a support ring 32 as is well known in the art. A potential, positive with respect to the dielectric layer 26, is maintained on the collector electrode 28. Also in the embodiment of the invention shown in FIGURE 1 an electrical connection 34 to the backing electrode 24 is provided through the envelope 4 for the purpose of deriving output signals therefrom.

In operation, the electron beam 8 is caused to scan the target assembly 12 in raster fashion by applying appropriate voltages to the cathode 14 and the electrodes of the electron gun 6 and deflecting plates of the deflection system 10. The backing electrode 24 is maintained at a fixed potential of about 5 volts positive with respect to the average potential of the cathode 14 of the electron gun 6 by means of the electrical connection 34 from the backing electrode 24 to the potential source 36. Initially, the potential of the surface of the dielectric layer 26 facing the electron gun 6 is maintained at or near the cathode potential by scanning the dielectric layer with low velocity electrons from the cathode 14 for which the secondary emission at the dielectric surface is less than unity.

Incoming electrical signals representative of target information are applied to the cathode 14 of the electron gun 6 whereby the cathode potential fluctuates by an amount which is small (i.e., one or two volts) in comparsion with the voltage on the backplate and the electron beam 8 is caused to scan the dielectric layer 26 with low velocity electrons for which the secondary emission ratio at the dielectric surface is less than unity. As determined by the incoming information signals, elemental areas of the dielectric surface will be charged to the instantaneous cathode potential in a point-to-point fashion by the phenomenon of secondary emission. On succeeding scans, the cathode potential will always be the same every time the beam 8 strikes a given point or elemental area on the dielectric layer 26 for unchanging information. Inasmuch as the resistivity of the dielectric layer 26 is less than infinite, some of the charge on the dielectric surface will leak through this layer during the time between scans of the beam. Since the dielectric relaxation time or RC time constant of the dielectric layer 26 is relatively large, the loss of voltage across the layer 26 between scans is small and both the charge lost and the charge replaced by the electron beam 8 will correspond to the small current which would flow through the dielectric if the voltage were constant. Thus where the potential of the cathode is the same for a given elemental area from scan to scan, a small current will flow which corresponds to the voltage across the layer at that elemental area. For unchanging information the charge replaced by the beam which leaked through the dielectric layer is approximately the same from point to point on the target, hence there will be little fluctuation of current flowing through the signal resistor 38 which is in series with the backing electrode 24.

Now, however, if the information for a given elemental area changes, the cathode potential will not be the same as it was for that elemental area during the previous scan. Hence, the beam must replace not only the charge lost by leakage between scans but it must also supply more or less charge in order to bring the dielectric surface at this elemental area to the new cathode potential. Thus, if the cathode potential is changed to a lower value for subsequent scans, a much larger charging current will flow for several scans of the beam until the capacitance at a give elemental area on the dielectric layer is charged to an equilibrium corresponding to the new backing electrode-cathode potential difference. After this new equilibrium has been reached, the charge lost between scans due to leakage is matched by the charge replaced by the beam and again only a small and fixed current will flow. If the cathode potential is changed to a higher value for subsequent scans, no charging current will flow until sufficient charge has leaked through the dielectric layer to reduce the voltage thereacross and, hence to raise the potential of the dielectric surface to the point where electrons can again land thereon.

With the signal resistor 38 between the backing electrode 24 and the voltage source 36, the charging (or displacement) current flowing through the capacitance in the dielectric layer 26 when the electron beam 8 strikes the surface thereof will cause a voltage drop across the resistor 38 which is proportional to this charging current. This voltage drop, which will fluctuate as the beam scans from point to point, provides the output signal from the tube 2. The leakage current which flows through the dielectric layer 26 between scans, due to the finite resistance thereof, does not cause a voltage drop in the signal resistor 38 directly since it is flowing in an isolated internal circuit at the time, but it does determine the amount of charging current necessary to restore the voltage across the dielectric layer 26. Thus, changes in a periodically-recurring signal input on the cathode 14 will cause the signal output to change from the small fluctuations due to differences in the small equilibrium charging currents to large fluctuations due to large or zero charging currents which flow while new equilibriums are being reached.

Referring now to FIGURE 2, another form of a suitable target structure according to the present invention is illustrated. In this embodiment, a backing electrode 24 of electrically conductive material is provided with a semiconductor type of a leaky dielectric layer 26. The target 26 may comprise layers of high resistivity semiconductor materials such as layer 40 of selenium, which is of P-type conductivity, and a layer 42 of cadmium selenide, which is of N-type conductivity, thus providing adjacent regions of opposite conductivity type whereby a rectifying junction or boundary 44 therebetween is established. The formation of such rectifying barriers or junctions is well known in the semiconductor art and further detailed description thereof is not deemed necessary herein. In securing or mounting the semiconductor layer 26 to the backing electrode 24 care should be taken to provide for an ohmic and not a rectifying electrical connection. The disposition of the regions or layers 40, 42 of different conductivity types with respect to the backing electrode 24 is made to be such that when the backing electrode is positive with respect to the cathode 14 of the electron gun 6, the junction 44 is biased in the reverse direction. Under these circumstances the current flowing across the junction 44 will be almost independent of the voltage across the junction over a relatively wide range of voltages. The semiconductor layer 26 will have a high capacitance and a high, but finite resistance thus providing an excellent leaky dielectric layer in accordance with the present invention. One significant characteristic of this semiconductor-type of leaky dielectric target is that when the voltage across the target at any given elemental area thereof is the same from scan to scan, though different from other elemental areas on the target, the current flowing through the target at every elemental area will be the same, and there will be no output whatever. Thus a tube incorporating a target of the semiconductor junction type may provide a cancellation ratio of infinity.

Referring now to FIGURE 3 for a more detailed description of the cancellation principle of a leaky dielectric target according to the invention, the surface potential in volts of the dielectric layer relative to the cathode potential is plotted on the abscissa against the negative charging rate of the target in arbitrarily chosen units plotted on the ordinate. The curve A represents the reverse current-voltage characteristic of the junction in a semiconductor type dielectric target and constitutes what may be regarded as a load line which crosses the secondary emission characteristic (represented by curves B and C) of the dielectric surface at two different cathode potentials (2 volts and −2 volts represented by points $V_A$ and $V_B$, respectively). The curve D represents what may be regarded as a load line for the single dielectric target described in connection with the embodiment of FIGURE 1. Points $I_A$ and $I_B$ are points at which curve A crosses the secondary emission characteristic curves C and B, respectively. Curve D crosses the secondary emission characteristic curves B and C at points $I_B$ and $I_C$, respectively. Points $I_A$, $I_B$, and $I_C$ represent the equilibrium currents through the target for the two different cathode potentials and, in the case of the semi-conductor type dielectric target, are seen to be identical. For rapid changes of the cathode-to-backing electrode potential, the capacitance of the dielectric target fixes the voltage drop across it, shorting out the resitance of the target, while the current is determined by the secondary emission characteristic of the dielectric surface in combination with the output signal resistor which provides what may be regarded as a temporary load line represented by curves E and F. Thus, when the cathode potential is suddenly changed from that represented at point $V_A$ to that represented at point $V_B$, the current increases along the temporary signal resistor load line F to the secondary emission curve B for the lower cathode potential. Then the voltage across the dielectric target increases as the capacitance thereof is charged by this increased current and the current follows the secondary emission characteristic to equilibrium at point $I_B$. When the cathode potential is suddenly shifted in the other direction, the current drops to zero until the voltage across the dielectric capacitance has been discharged by the dielectric resistance sufficiently that the surface potential of the dielectric target is once again above the cathode potential whereupon charging again takes place such equilibrium is again reached at point $I_A$ or $I_C$.

In FIGURE 2 a reverse-biased junction is established in the dielectric layer between the two regions of opposite conductivity. Alternatively, a reverse-biased junction may be provided by virtue of other mechanisms such as by a difference in work function or by a difference in impurity carrier concentration rather than by the type of conductivity. Thus one region may be more heavily doped than the other to provide adjacent N+N regions with a junction therebetween. Referring now to FIGURE 4 the junction 44 is provided at the interface between the backing electrode 24 and a layer 26 of semiconductor material which may be P-type. An additional junction may exist in any of the foregoing cases at or near contact between the electron beam 8 and the surface of the dielectric layer due to surface states at the dielectric-to-vacuum boundary, although the action of one of the junctions, probably the one between the backing electrode and the dielectric or the one between dissimilar semiconductor materials, would predominate.

In accordance with the foregoing description it will be understood that the output of the tube shown in FIGURE 1 will be asymmetrical or non-linear with input changes. Thus, as will be seen from FIGURE 3, a shift in cathode potential in the negative direction results in a large current increase while an equal shift in the positive direction results in a small decrease to zero current. In a typical situation, input pulses of either polarity might be expected to shift in the time sequence of the incoming information which would constitute a motion of potential across the target. Such non-linearity may be avoided by differentiating the incoming signal to replace each pulse, of either polarity, with two pulses in close succession, one of each polarity, so that there will always be present a change of cathode potential in the negative direction to provide a large output signal. This technique is especially effective to make fixed target cancellation equally sensitive to video information generated by black and white objects moving against a gray background which is the optical situation which gives rise to pulses of both polarities moving in the time sequence of the video signal from a television camera.

Referring now to FIGURE 5 another embodiment of a fixed target cancellation cathode ray tube is shown wherein the target information is optical rather than electrical as in the case of the tube of FIGURE 1. An evacuated envelope 50 is shown containing an electron gun assembly comprising a cathode member 60 and an intensity grid member 62 whereby an electron beam 8 may be formed. Within the envelope 50 is also an alignment cylinder 64 which is adapted to cooperate with an alignment coil 66 externally mounted around the tube envelope. The purpose of the alignment cylinder 64 and the alignment coil 66 is to align or bring the electron beam 8 emanating from the electron gun on axis prior to deflection. Likewise externally mounted around and along the tube envelope 50 are an electromagnetic deflection yoke 56 and a focusing coil 54. These alignment, deflection, and focusing components and their functions are well-known in the art of cathode ray tubes and further detailed description thereof is not deemed necessary herein. It should be understood that electrostatic components may be alternatively employed rather than the electromagnetic type shown.

Disposed within the envelope 50 and extending therealong for a substantial distance is an electrostatic acceleration cylinder 58 which likewise is well-known in the art and may also take the form of a conductive coating of graphite or the like on the inside wall of the envelope. Adjacent the target end of the tube and remote from the electron gun assembly is a deceleration lens or electrode cylinder 59. It should be understood that the electron beam 8 is required to be first accelerated to a predetermined velocity in order to permit precise and convenient deflection thereof. However, after such deflection has been achieved it is necessary to decelerate the beam in order to permit the beam to strike the target at a relatively low velocity for which the secondary emission ratio at the dielectric surface thereof is less than unity. Hence, the reason for providing components to successively accelerate and decelerate the electron beam 8.

The target assembly at the end of the envelope opposite the electron gun assembly comprises a transparent, electrically insulating support member 71, which may be of glass and constituted by the faceplate of the end of the envelope. On the side of the support member 71 facing the electron gun assembly is a transparent, electrically conductive coating or layer 70 constituting an electrode or backplate. This transparent backplate may be provided by a layer of tin oxide or gold, for example. Superimposed on the transparent backplate 70 is a layer of photoconductor material 72 such as selenium, for example, and superimposed on the photoconductor layer 72 is a leaky dielectric target layer 73 such as described hereinbefore.

The resistivity of the photoconductor in the dark should be of the same order of magnitude as that of the leaky dielectric layer, but it should be much lower when illuminated. Therefore, with a fixed optical image focused on the photoconductor, the voltage between backplate and target surface being scanned will be the same at all points of the target, but it will be divided differently between the two layers, depending upon the illumination. For example, where there is high illumination, most of the voltage will appear across the leaky dielectric layer and the capacitance of that layer will be charged to this voltage. Where there is low illumination, a substantial part of the voltage will appear across the photoconductive layer and the leaky dieletric layer will be charged to a lesser voltage.

Now, when the illumination of an area changes from a low level to a high level, the voltage across the photoconductor drops because the capacitance of the photoconductive layer is discharged by the reduced resistivity (photoconductivity). When the scanning beam reaches this area, a large capacitive current will flow to the backplate as a result of the charging required to bring the voltage across the leaky dielectric layer up to the larger value now needed to compensate for loss of voltage across the photoconductive layer. (The sum of the voltages across the two layers must equal, approximately, the voltage between cathode and backplate, as before.)

When the illumination of an area changes from a high level to a low level, there will be less loss of charge across the photoconductive layer than before and, when the scanning beam reaches this area, less current will flow to the backplate than on previous scans. There will be less current in such an area for several returns of the beam, until the cathode-to-backplate voltage has been divided between the two layers as determined by the new level of illuimnation in that area.

Thus, depending upon the charging required of the electron beam, there will be more or less secondary electron emission from the surface of the leaky dielectric layer to form a "return" electron flow 8' which is ultimately collected by an electron multiplier arrangement 68 comprising a number of perforated plates or screens capable of emitting a plurality of secondary electrons upon impingement by the returning electrons (designated as 8') in a ratio of secondaries to primaries greater than unity. As is well known, each succeeding plate or screen has a successively higher potential. A terminal collection plate 69 is provided to collect or receive the secondary electrons emitted by the preceding screens, the terminal plate being connected to a source of positive potential to enhance this collection process. The signal output of the tube in this embodiment is thus derived through this electron multiplier section in order to avoid modulation of the backplate voltage and also in order to obtain a sufficiently strong signal in the case of extremely low illumination intensity at the input.

What is claimed is:

1. An electronic tube for cancelling electrical input signals representing unchanging information comprising: a semi-conductor target comprising layers of semiconductor material forming a rectifying barrier therebetween and disposed on an electrically conductive electrode member, an electron gun adapted to scan said semiconductor target with an electron beam, said semiconductor target being characterized by having a secondary emission ratio of less than unity, and a capacitive time constant which is longer than the time between scans of said electron beam, means for modulating said electron beam in accordance with said electrical input signals, and means for deriving an electrical output signal from said semiconductor target in response to the scanning thereof by said electron beam.

2. The invention according to claim 1 wherein said semiconductor target includes layers of semiconductor material of opposite conductivity to thereby form a P–N rectifying barrier therebetween.

3. The invention according to claim 1 in which said semiconductor target includes a layer of P-type selenium and a layer of N-type cadmium selenide.

References Cited by the Examiner
UNITED STATES PATENTS

| | | | |
|---|---|---|---|
| 2,890,359 | 6/1959 | Heijne et al. | 313—65 |
| 2,970,219 | 1/1961 | Roberts | 313—65 |
| 2,973,445 | 2/1961 | Rogers | 313—67 |
| 2,986,673 | 5/1961 | Schagen et al. | 315—12 |
| 3,002,124 | 9/1961 | Schneeberger | 313—68 |
| 3,011,089 | 11/1961 | Reynolds | 313—65 |
| 3,136,909 | 6/1964 | Cope | 313—65 |

DAVID G. REDINBAUGH, *Primary Examiner.*

DAVID J. GALVIN, *Examiner.*